(12) United States Patent
Hu et al.

(10) Patent No.: US 11,314,031 B2
(45) Date of Patent: Apr. 26, 2022

(54) OPTICAL ELEMENT DRIVING MECHANISM

(71) Applicant: TDK TAIWAN CORP., Taoyuan (TW)

(72) Inventors: Chao-Chang Hu, Taoyuan (TW);
Shu-Shan Chen, Taoyuan (TW);
Jungsuck Ryoo, Taoyuan (TW);
Min-Hsiu Tsai, Taoyuan (TW);
Chieh-An Chang, Taoyuan (TW);
Pai-Jui Cheng, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 56 days.

(21) Appl. No.: 16/900,079

(22) Filed: Jun. 12, 2020

(65) Prior Publication Data

US 2021/0132319 A1 May 6, 2021

Related U.S. Application Data

(60) Provisional application No. 62/929,280, filed on Nov. 1, 2019.

(51) Int. Cl.
*G02B 7/00* (2021.01)
*G03B 5/04* (2021.01)
*H04N 5/232* (2006.01)
*G02B 23/08* (2006.01)
*G02B 27/10* (2006.01)
*G02B 27/64* (2006.01)

(52) U.S. Cl.
CPC ............ *G02B 7/005* (2013.01); *G02B 23/08* (2013.01); *G03B 5/04* (2013.01); *H04N 5/232* (2013.01); *G02B 27/10* (2013.01); *G02B 27/646* (2013.01); *G03B 2205/0053* (2013.01)

(58) Field of Classification Search
CPC ... G02B 7/005; G03B 5/04; G03B 2205/0061
See application file for complete search history.

(56) References Cited

U.S. PATENT DOCUMENTS

| 5,410,206 A | * | 4/1995 | Luecke | ................... | H02N 2/101 |
| | | | | | 310/317 |
| 2015/0130956 A1 | * | 5/2015 | Ohashi | ................... | G02B 27/64 |
| | | | | | 348/208.11 |
| 2017/0047864 A1 | * | 2/2017 | Stang | ..................... | H02N 2/025 |

(Continued)

FOREIGN PATENT DOCUMENTS

CN 209486373 U 10/2019

OTHER PUBLICATIONS

A Chinese Office Action cited in counterpart application No. CN202021090074.6, dated Dec. 9, 2020, 2 pages.

*Primary Examiner* — Clayton E. LaBalle
*Assistant Examiner* — Diana Hancock
(74) *Attorney, Agent, or Firm* — Muncy, Geissler, Olds & Lowe, P.C.

(57) ABSTRACT

An optical element driving mechanism has an optical axis and includes a fixed portion, a movable portion, and a driving assembly. The movable portion is movable relative to the fixed portion. The driving assembly drives the movable portion to move relative to the fixed portion, wherein the driving assembly moves along a first direction to move the movable portion along a second direction, the first direction is different from the second direction.

20 Claims, 8 Drawing Sheets

(56) References Cited

U.S. PATENT DOCUMENTS

| | | | | |
|---|---|---|---|---|
| 2018/0175747 A1* | 6/2018 | Tomura | .................... | H02N 2/08 |
| 2018/0210194 A1* | 7/2018 | Nishiyama | ................ | B06B 1/06 |
| 2020/0393637 A1* | 12/2020 | Ryoo | ..................... | H02N 2/142 |

* cited by examiner

OPTICAL ELEMENT DRIVING MECHANISM

CROSS-REFERENCE TO RELATED APPLICATIONS

The present application claims priority to U.S. Provisional Patent Application No. 62/929,280, filed on Nov. 1, 2019, which is incorporated by reference herein in their entirety.

BACKGROUND OF THE DISCLOSURE

Field of the Disclosure

The present invention relates to a driving mechanism, and more particularly to an optical element driving mechanism.

Description of the Related Art

The design of today's electronic devices is continually moving toward miniaturization, so that various elements or structures of optical modules used in such applications as imaging must be continuously reduced in size in order to achieve miniaturization. Therefore, how to design a miniature driving mechanism has become an important issue.

BRIEF SUMMARY OF THE DISCLOSURE

An embodiment of the invention provides an optical element driving mechanism having an optical axis, which includes a fixed portion, a movable portion, a driving assembly, and an elastic element. The movable portion is movable relative to the fixed portion. The driving assembly drives the movable portion to move relative to the fixed portion. The elastic element connects the fixed portion and the movable portion.

According to some embodiments of the present disclosure, the driving assembly includes a piezoelectric element, a transmission element, a clamping element, a conversion element, and a first intermediary element. The piezoelectric element has a circular plate shape extending along a third direction. The transmission element is connected to the piezoelectric element. The clamping element is disposed on the transmission element, and is movable relative to the transmission element. The conversion element is connected to the clamping element. The first intermediary element is connected to the conversion element and the movable portion. The piezoelectric element makes the transmission element move along the first direction. The transmission element further makes the clamping element move along the first direction, and the conversion element and the first intermediary element enable the movable portion to move along the second direction. The movable portion has a movable-portion-sliding surface. The fixed portion has a fixed-portion-sliding surface, and the conversion element has a conversion-element-first-sliding surface and a conversion-element-second-sliding surface. The conversion-element-first-sliding surface faces the movable-portion-sliding surface. The movable-portion-sliding surface and the conversion-element-first-sliding surface are not perpendicular to the first direction and the second direction. The movable-portion-sliding surface and the conversion-element-first-sliding surface are not parallel to the first direction and the second direction. The conversion-element-second-sliding surface faces the fixed-portion-sliding surface. The conversion-element-second-sliding surface and the fixed-portion-sliding surface are parallel to the first direction. The movable-portion-sliding surface has a movable-portion-sliding rail. The conversion-element-first-sliding surface has a first groove. The first groove and the movable-portion-sliding rail accommodate part of the first intermediary element, respectively. The driving assembly further includes a second intermediary element. The conversion-element-second-sliding surface has a second groove. The fixed-portion-sliding surface has a fixed-portion-sliding rail extending along the first direction. The second groove and the fixed-portion-sliding rail accommodate part of the second intermediary element, respectively.

According to some embodiments of the present disclosure, the optical element driving mechanism further includes a bonding element. The fixed portion further includes a base. The driving assembly is connected to the base of the fixed portion using the bonding element. The base has a first connecting surface which is parallel to the second direction. The bonding element is disposed between the first connecting surface of the base and the piezoelectric element. The base further has a second connecting surface. The second connecting surface is perpendicular to the second direction. The bonding element is further disposed between the second connecting surface and the transmission element. When viewed along the second direction, the first connecting surface at least partially overlaps the transmission element. When viewed along the second direction, the second connecting surface at least partially overlaps the transmission element.

According to some embodiments of the present disclosure, the optical element driving mechanism further includes a guiding element. The movable portion has a first chute, and an inner wall of the first chute is covered with a coating. The guiding element is fixedly disposed on the fixed portion, and is at least partially located in the first chute of the movable portion to enable the movable portion to move along the guiding element. When viewed along the third direction, the guiding element and the conversion element at least partially overlap. When viewed along the third direction, the guiding element and the transmission element at least partially overlap. When viewed along the third direction, the guiding element, the conversion element, and the transmission element at least partially overlap. The movable portion further has a second chute, and the first chute and the second chute are at least one type of a closed type and a non-closed type. The movable portion has a top surface and a bottom surface, and the fixed portion has an inner top wall and an inner bottom wall, and the top surface faces the inner top wall and the bottom surface faces the inner bottom wall. The top surface, the bottom surface, the inner top wall, and the inner bottom wall are perpendicular to the second direction. When viewed along the third direction, a first distance between the top surface and the inner top wall is shorter than a length of the guiding element in the second direction, and a second distance between the bottom surface and the inner bottom wall is shorter than the length of the guiding element in the second direction. The guiding element either has a cylindrical structure extending along the second direction or the guiding element has a spherical structure.

According to some embodiments of the present disclosure, the optical element driving mechanism having a rectangular structure, further includes a first elastic element and a second elastic element. The first elastic element has two first movable connecting portions connecting the movable portion and two first fixed connecting portions connecting the fixed portion, the first movable connecting portions are arranged diagonally in the rectangular structure. The first fixed connecting portions are arranged diagonally in the rectangular structure. When viewed along the second direction, the first movable connecting portions and the first fixed connecting portions do not overlap. The second elastic element is disposed closer to a light emitting surface than the first elastic element. The second elastic element is disposed diagonally with the driving assembly. The second elastic element has a second movable connecting portion connected to the movable portion and a second fixed connecting portion connected to the fixed portion. When viewed along the second direction, the first elastic element and the second elastic element do not overlap. When viewed along the second direction, the driving assembly partially overlaps the first elastic element. When viewed along the second direction, the driving assembly and the second elastic element do not overlap. When viewed along the second direction, the second movable connecting portion and one of the first movable connecting portions are located in the same corner of the rectangular structure.

According to some embodiments of the present disclosure, the optical element driving mechanism further includes a position sensing assembly for sensing the relative movement of the fixed portion and the movable portion. At least part of the position sensing assembly is disposed on the movable portion. At least one other part of the position sensing assembly is disposed on the fixed portion. The position sensing assembly includes a sensing element and a sensing magnetic element. The sensing element is disposed on the fixed portion. The sensing magnetic element is disposed on the movable portion. The optical element driving mechanism having a rectangular structure, further includes a circuit assembly electrically connected to the driving assembly. When viewed along the second direction, the circuit assembly is disposed on at least two sides of the rectangular structure. The position sensing element includes a sensing element and a sensing magnetic element. The sensing element is disposed on the circuit assembly, and the sensing magnetic element is disposed on the movable portion.

BRIEF DESCRIPTION OF THE DRAWINGS

Aspects of this disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

Figure 1:
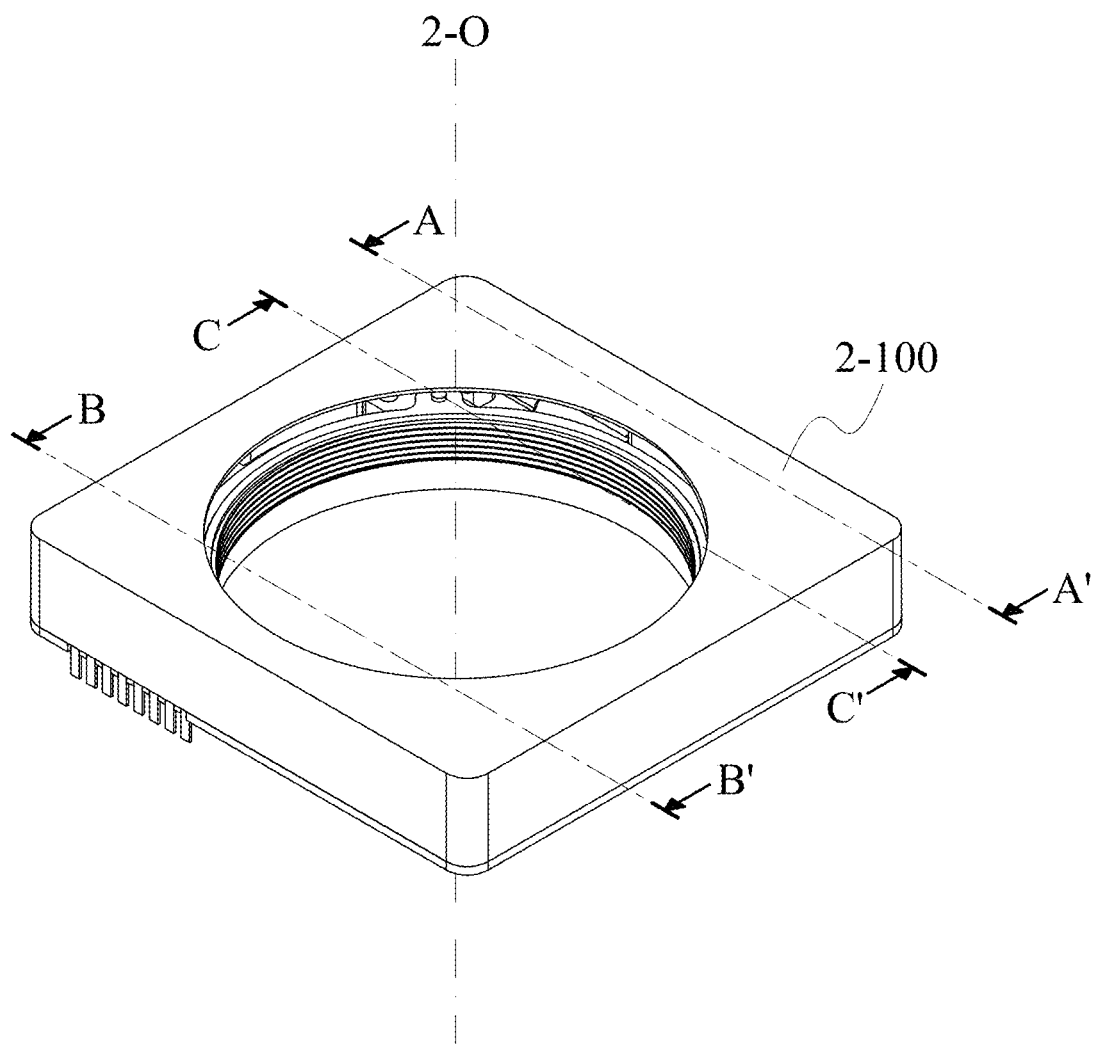
FIG. 1 is a perspective view of an optical element driving mechanism according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
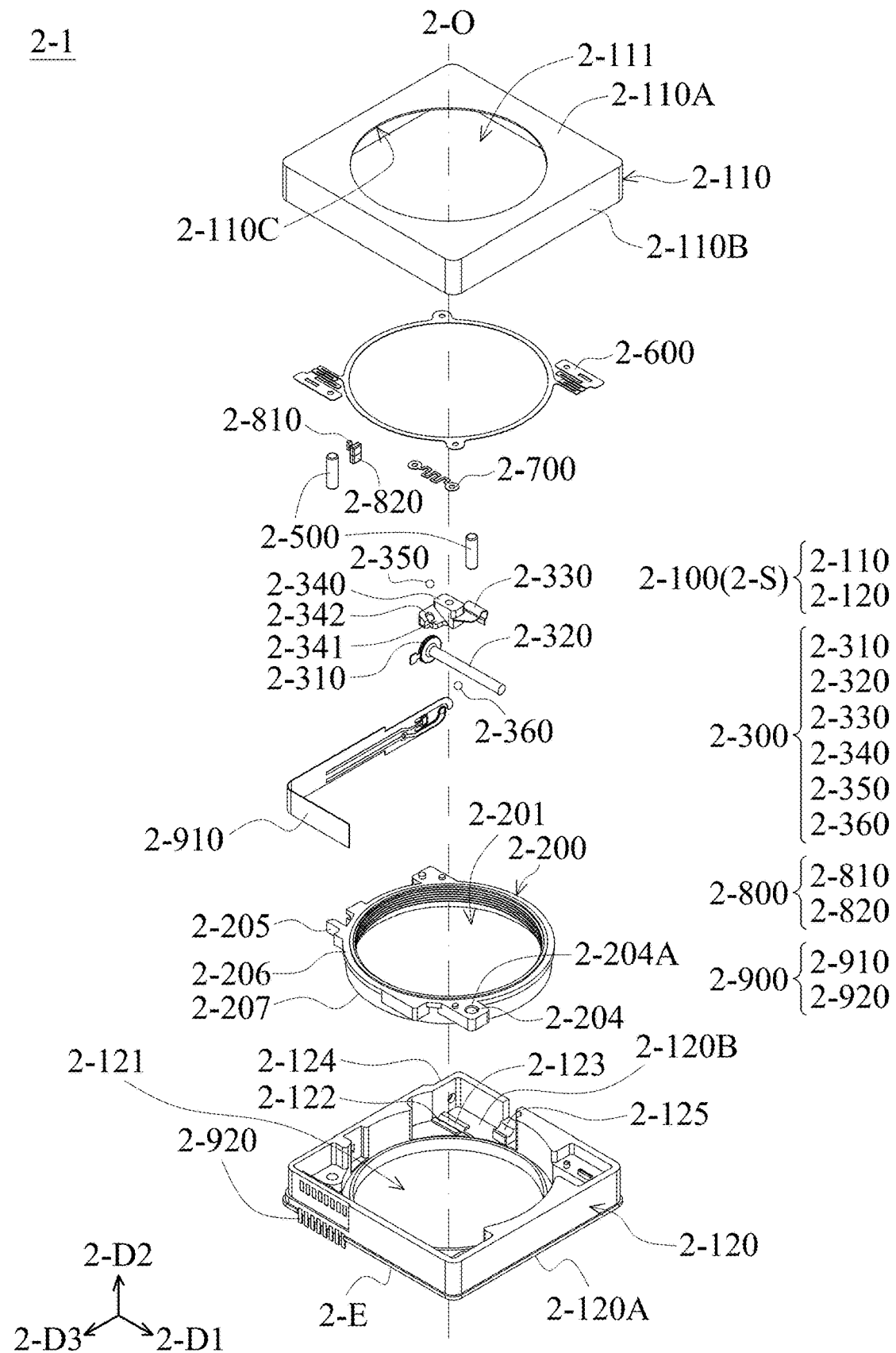
FIG. 2 is an exploded view of an optical element driving mechanism according to an embodiment of the present disclosure.

Refer to FIG. 1 to FIG. 2. FIG. 1 is a perspective view of the optical element driving mechanism 2-1 according to an embodiment of the present disclosure. FIG. 2 is an exploded view of the optical element driving mechanism 2-1 according to an embodiment of the present disclosure. The optical element driving mechanism 2-1 has an optical axis 2-0, and includes a fixed portion 2-100, a movable portion 2-200, a driving assembly 2-300, and a bonding element 2-400 (refer to FIG. 7), two guiding elements 2-500, a first elastic element 2-600, a second elastic element 2-700, a position sensing assembly 2-800, and a circuit assembly 2-900, wherein the driving element 2-300 is moved along a first direction 2-D1 to move the movable portion 2-200 along a second direction 2-D2. The first direction 2-D1 is different from the second direction 2-D2. In this embodiment, the first direction 2-D1 is perpendicular to the second direction 2-D2, and the second direction 2-D2 is parallel to the optical axis 2-0. In this embodiment, the optical element driving mechanism 2-1 has an auto focusing (AF) function, but is not limited to this. In some embodiments, the optical element driving mechanism 2-1 can also have auto focusing and optical image stabilization (OIS) functions.

The fixed portion 2-100 is a housing 2-S, including a top case 2-110 and a base 2-120. The top case 2-110 includes an outer top wall 2-110A, four side walls 2-110B, an inner top wall 2-110C, and a top case opening 2-111. The base 2-120 includes an outer bottom wall 2-120A, an inner bottom wall 2-120B, a base opening 2-121, a fixed-portion-sliding surface 2-122, a fixed-portion-sliding rail 2-123, a first connecting surface 2-124, and a second connecting surface 2-125. The top case 2-110 has a hollow structure, and can be combined with the base 2-120 to form a housing 2-S of the optical element driving mechanisms 2-1, wherein the top case 2-110 constitutes the outer top wall 2-110A and four side walls 2-110B of the housing 2-S, and the base 2-120 constitute the outer bottom wall 2-120A of the housing 2-S. It should be understood that the top case 2-110 and the base 2-120 are formed with a top case opening 2-111 and a base opening 2-121, respectively. The center of the top case opening 2-111 corresponds to the optical axis 2-0, and the base opening 2-121 corresponds to an image-sensing element (not shown in the figures) disposed outside the optical element driving mechanism 2-1. External light may enter the top case 2-110 through the top case opening 2-111, and is received by the image-sensing element (not shown in the figures) after passing through an optical element (not shown in the figures) and the base opening 2-121, so as to generate a digital image signal.

The movable portion 2-200 may be connected to the optical element, and moves relative to the fixed portion 2-100. In this embodiment, the movable portion 2-200 is a holder 2-200, which has a through hole 2-201, a movable-portion-sliding surface 2-202 (refer to FIG. 5), and a movable-portion-sliding rail 2-203 (refer to FIG. 5), a first chute 2-204, a second chute 2-205, a top surface 2-206, and a bottom surface 2-207, wherein the through hole 2-201 forms a threaded structure corresponding to another threaded structure on the outer peripheral surface of the optical element, so that the optical element may be secured in the through hole 2-201.

Figure 3:
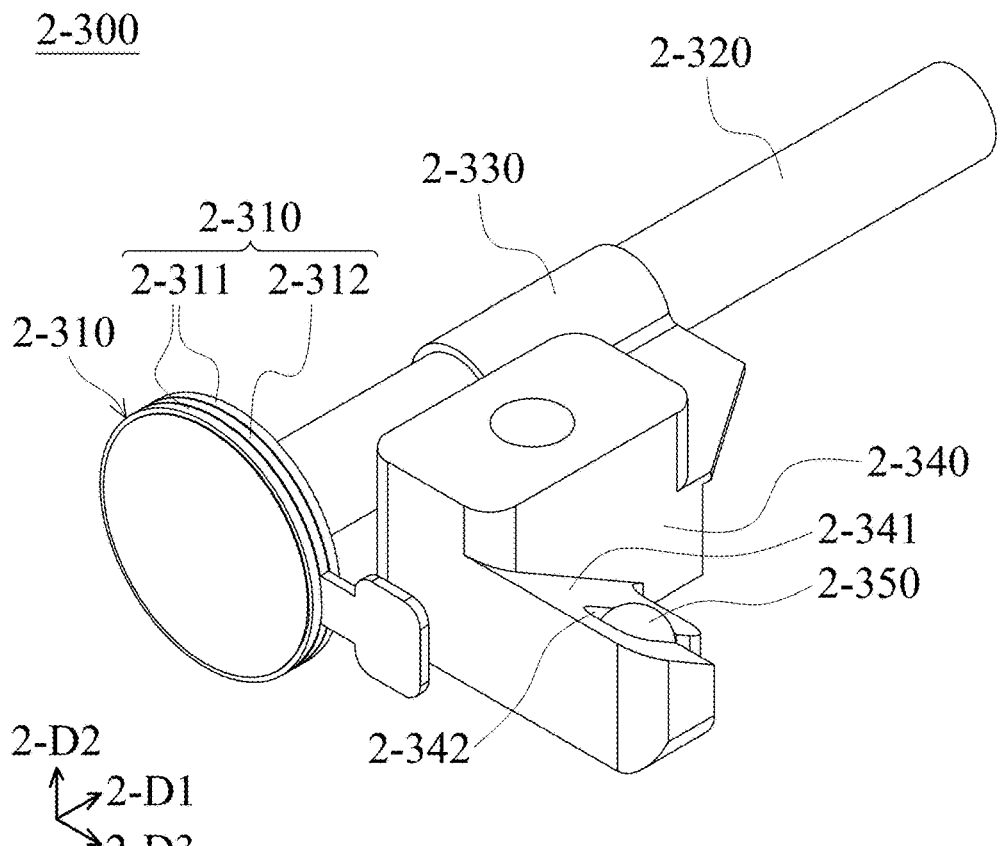
FIG. 3 is a schematic diagram of a driving assembly according to an embodiment of the present disclosure.
Figure 4:
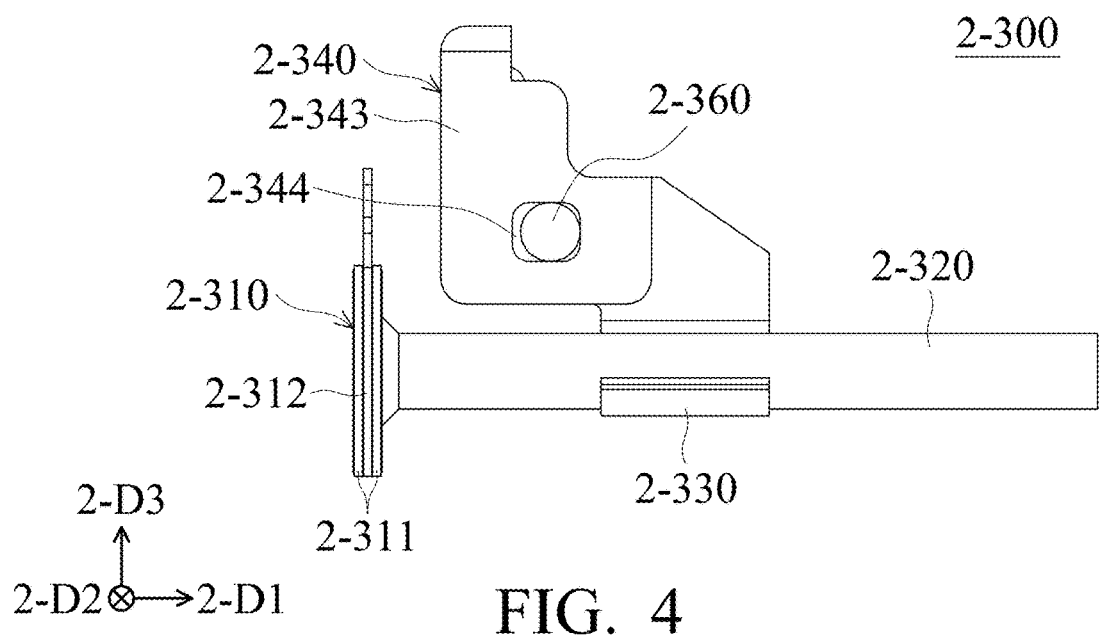
FIG. 4 is a schematic diagram of a different angle of a driving assembly according to an embodiment of the present disclosure.
Figure 5:
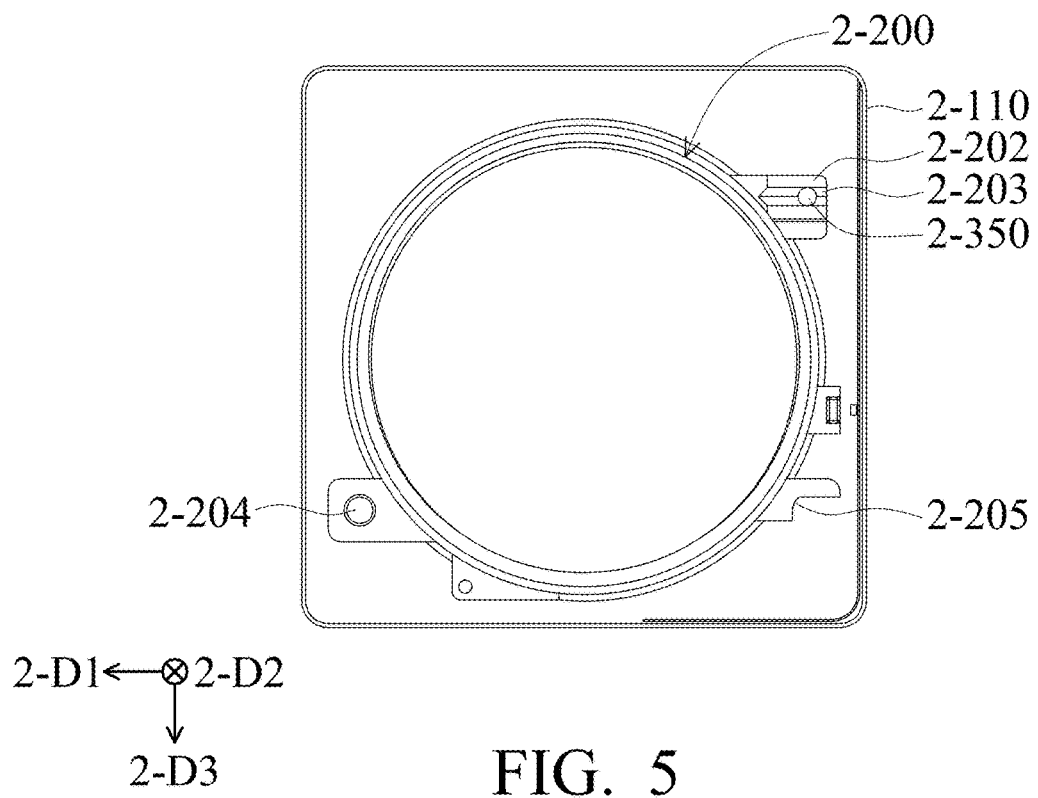
FIG. 5 is a bottom view of a partial structure of an optical element driving mechanism according to an embodiment of the present disclosure.
Figure 6:
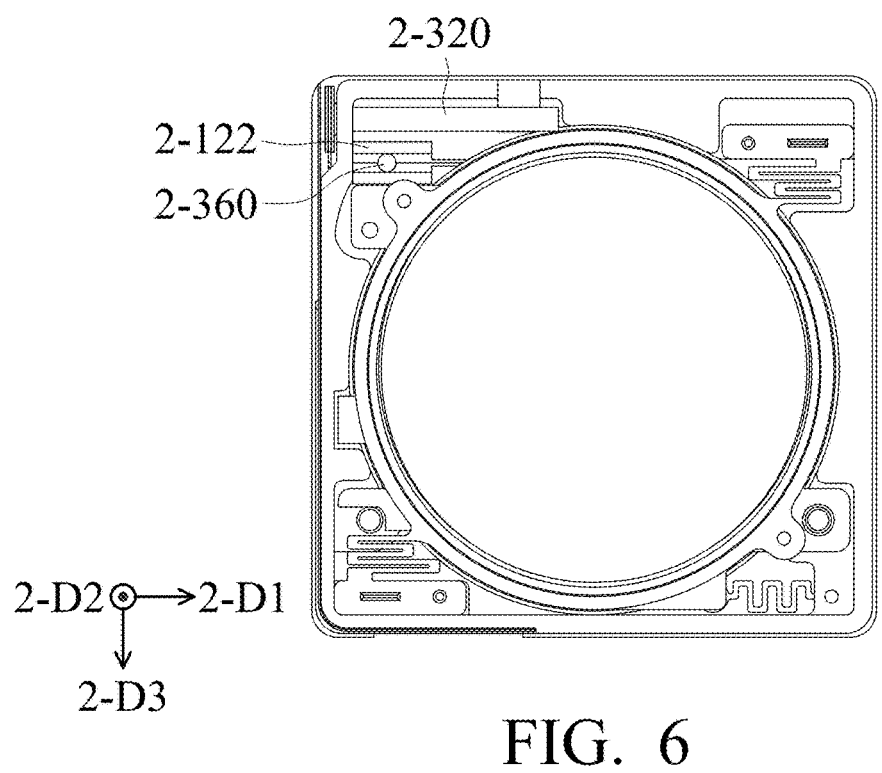
FIG. 6 is a top view of a partial structure of an optical element driving mechanism according to an embodiment of the present disclosure.

Refer to FIG. 2 to FIG. 6. FIG. 3 is a schematic diagram of the driving assembly 2-300 according to an embodiment of the present disclosure. FIG. 4 is schematic diagram of a different angle of the driving assembly 2-300 according to an embodiment of the present disclosure. FIG. 5 is a bottom view of a partial structure of the optical element driving mechanism 2-1 according to an embodiment of the present disclosure. FIG. 6 is a top view of a partial structure of the optical element driving mechanism 2-1 according to an embodiment of the present disclosure. The driving assembly 2-300 includes a piezoelectric element 2-310, a transmission element 2-320, a clamping element 2-330, a conversion element 2-340, a first intermediary element 2-350, and a second intermediary element 2-360. In this embodiment, the piezoelectric element 2-310 has a circular plate shape extending along a third direction 2-D3, the third direction 2-D3 is perpendicular to the first direction 2-D1, and the third direction 2-D3 is perpendicular to the second direction 2-D2. The piezoelectric element 2-310 includes two piezoelectric ceramic plates 2-311 and an elastic material sheet 2-312, and the elastic material sheet 2-312 is disposed between the two piezoelectric ceramic plates 2-311. The transmission element 2-320 is connected to the piezoelectric element 2-310. More specifically, the transmission element 2-320 is fixed to the center of the piezoelectric ceramic plate 2-311. The transmission element 2-320 is a long shaft with a cylindrical shape, and the direction of the long shaft is parallel to the first direction 2-D1. The clamping element 2-330 is disposed on the transmission element 2-320. The clamping element 2-330 uses an elastic material and has an arc shape. The arc shape matches the shape of the long shaft (the transmission element 2-320), so that the long shaft may pass through the clamping element 2-330, and the clamping element 2-330 may be clamped on the long shaft.

As shown in FIG. 3 and FIG. 4, the conversion element 2-340 is connected to the clamping element 2-330. More specifically, the clamping element 2-330 is formed in the conversion element 2-340 by inserting molding, but not limited to this. In some embodiments, the conversion element 2-340 and the clamping element 2-330 are integrally formed. The conversion element 2-340 has a conversion-element-first-sliding surface 2-341 and a conversion-element-second-sliding surface 2-343. The conversion-element-first-sliding surface 2-341 faces the movable-portion-sliding surface 2-202 (the movable-portion-sliding surface 2-202 is shown in FIG. 5), and the conversion-element-first-sliding surface 2-341 and the movable-portion-sliding surface 2-202 are not perpendicular or parallel to the first direction 2-D1, the second direction 2-D2, and the third direction 2-D3. The conversion-element-second-sliding surface 2-343 faces the fixed-portion-sliding surface 2-122 (the fixed-portion-sliding surface 2-122 is shown in FIG. 6), and the conversion-element-second-sliding surface 2-343 and the fixed-portion-sliding surface 2-122 are parallel to the first direction 2-D1.

The conversion-element-first-sliding surface 2-341 has a first groove 2-342, the movable-portion-sliding surface 2-202 has a movable-portion-sliding rail 2-203, and the extending direction of the movable-portion-sliding rail 2-203 is parallel to the movable-portion-sliding surface 2-202. The first groove 2-342 and the movable-portion-sliding rail 2-203 accommodate part of the first intermediary element 2-350 respectively. In other words, the first intermediary element 2-350 connects the conversion element 2-340 and the movable portion 2-200. In this embodiment, the first intermediary element 2-350 is a spherical metal or ceramic material, which is movably disposed between the first groove 2-342 and the movable-portion-sliding rail 2-203. The first groove 2-342 restricts the range of movement of the first intermediary element 2-350, and by the first intermediary element 2-350 moving in the movable-portion-sliding rail 2-203 may reduce the friction between the conversion-element-first-sliding surface 2-341 and the movable-portion-sliding surface 2-202. However, it is not limited to this. In some embodiments, the first intermediary element 2-350 may not be provided, and the friction between the two sliding surfaces may be reduced by changing the material of the sliding surfaces. In some embodiments, the first intermediary element 2-350 is fixedly disposed on the movable portion 2-200 or the conversion element 2-340. In addition, the positions of the groove and the sliding rail may be interchanged as required, or both the conversion element 2-340 and the movable portion 2-200 are designed with the sliding rails.

The second intermediary element 2-360 is disposed between the conversion element 2-340 and the fixed portion 2-100. More specifically, the conversion-element-second-sliding surface 2-343 has a second groove 2-344, and the fixed-portion-sliding surface 2-122 has a fixed-portion-sliding rail 2-123 extending along the first direction 2-D1. The second groove 2-344 and the fixed-portion-sliding rail 2-123 accommodate part of the second intermediary element 2-360 respectively. Similar to the first intermediary element 2-350, the second intermediary element 2-360 is movably disposed between the second groove 2-344 and the fixed-portion-sliding rail 2-123, and the second groove 2-344 restricts the range of movement of the second intermediary element 2-360, and by the second intermediary element 2-360 moving in the fixed-portion-sliding rail 2-123 may reduce the friction between the conversion-element-second-sliding surface 2-343 and the fixed-portion-sliding surface 2-122.

Figure 7:
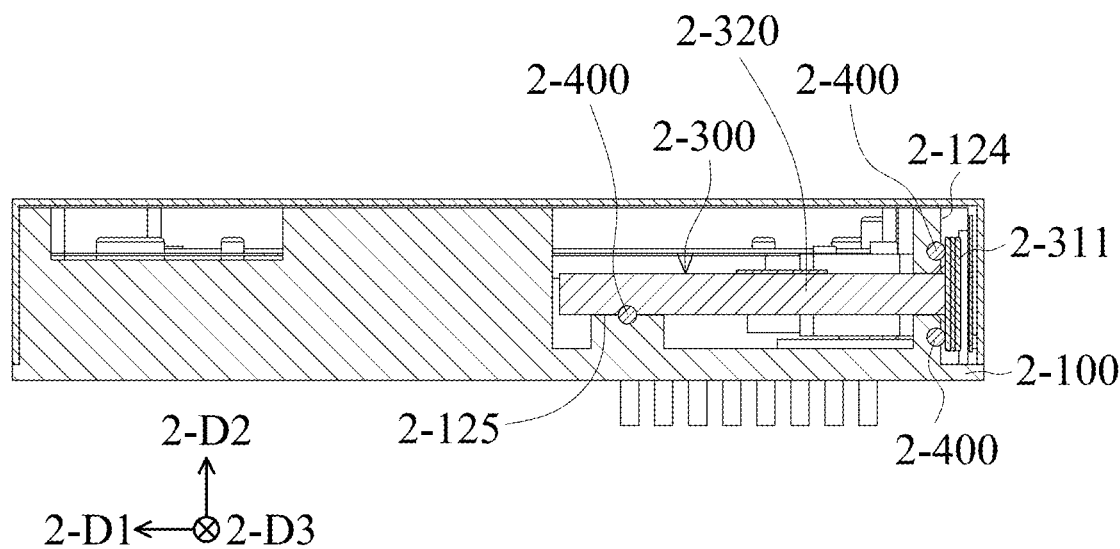
FIG. 7 is a cross-sectional view of the optical element driving mechanism taken along line A-A' in FIG. 1.
Figure 8:
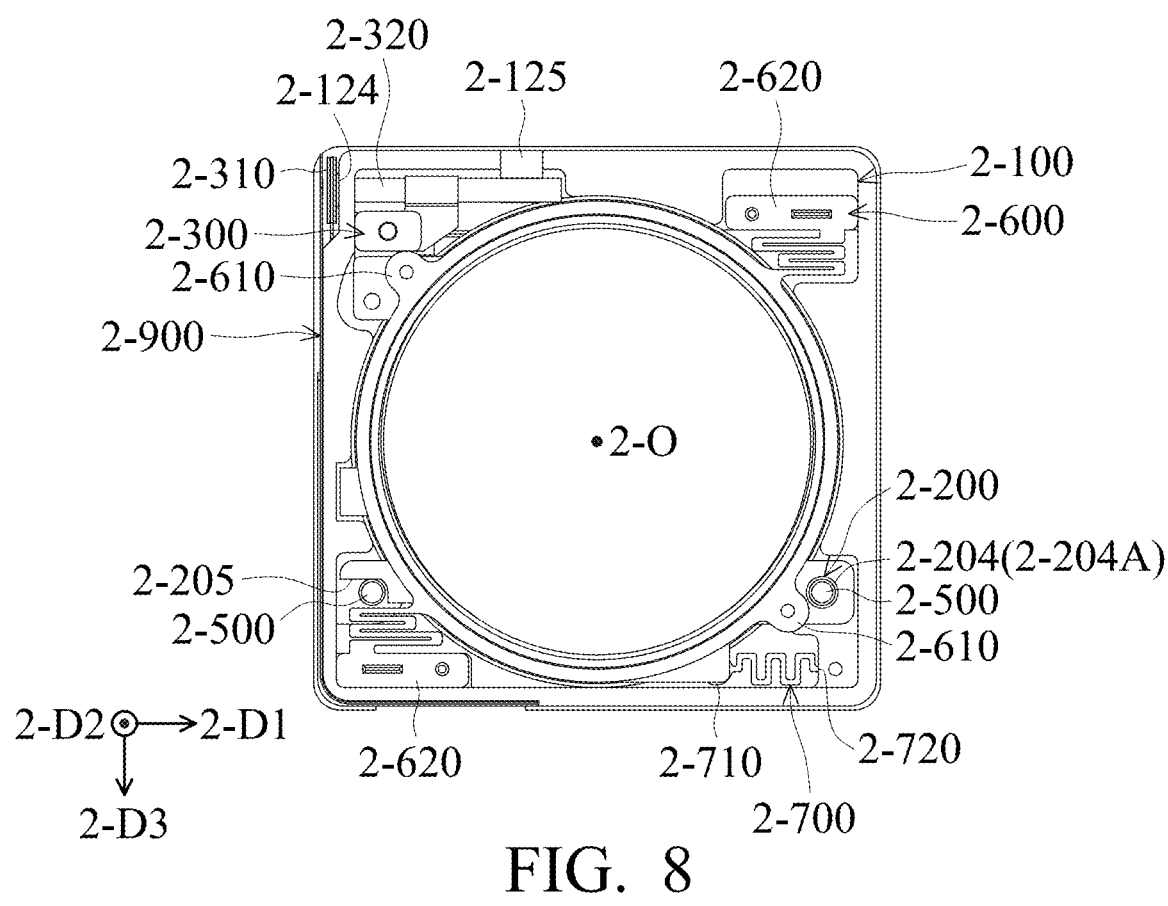
FIG. 8 is a top view of a partial structure of an optical element driving mechanism according to an embodiment of the present disclosure.

Refer to FIG. 7 and FIG. 8. FIG. 7 is a cross-sectional view of the optical element driving mechanism 2-1 taken along line A-A' in FIG. 1, and FIG. 8 is a top view of a partial structure of the optical element driving mechanism 2-1 according to an embodiment of the present disclosure. The driving element 2-300 may be connected to the fixed portion 2-100 by using the bonding element 2-400. More specifically, the base 2-120 has a first connecting surface 2-124 parallel to the second direction 2-D2, and the first connecting surface 2-124 faces the piezoelectric ceramic plate 2-311 of the piezoelectric element 2-310, and the bonding element 2-400 may be disposed between the piezoelectric ceramic plate 2-311 and the first connecting surface 2-124. When viewed along the second direction 2-D2, the first connecting surface 2-124 at least partially overlaps the transmission element 2-320.

The base 2-120 also has a second connecting surface 2-125 perpendicular to the second direction 2-D2, the second connecting surface 2-125 faces the transmission element 2-320, and the bonding element 2-400 may be disposed between the transmission element 2-320 and the second connecting surface 2-125. When viewed along the second direction 2-D2, the second connecting surface 2-125 at least partially overlaps the transmission element 2-320. In this embodiment, the bonding element 2-400 is a soft adhesive, which connects the driving assembly 2-300 and the fixed portion 2-100, and the soft adhesive enables the piezoelectric element 2-310 and the transmission element 2-320 moving in a specific range relative to the base 2-120 in the first direction 2-D1.

Figure 9:
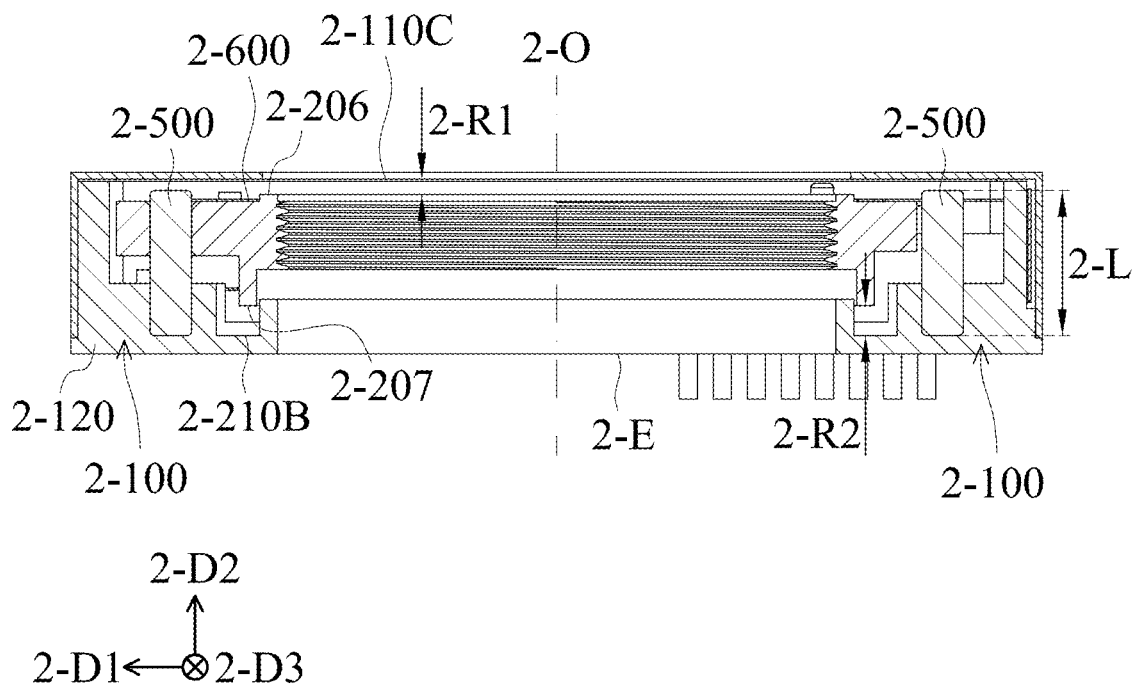
FIG. 9 is a cross-sectional view of the optical element driving mechanism taken along line B-B' in FIG. 1.
Figure 10:
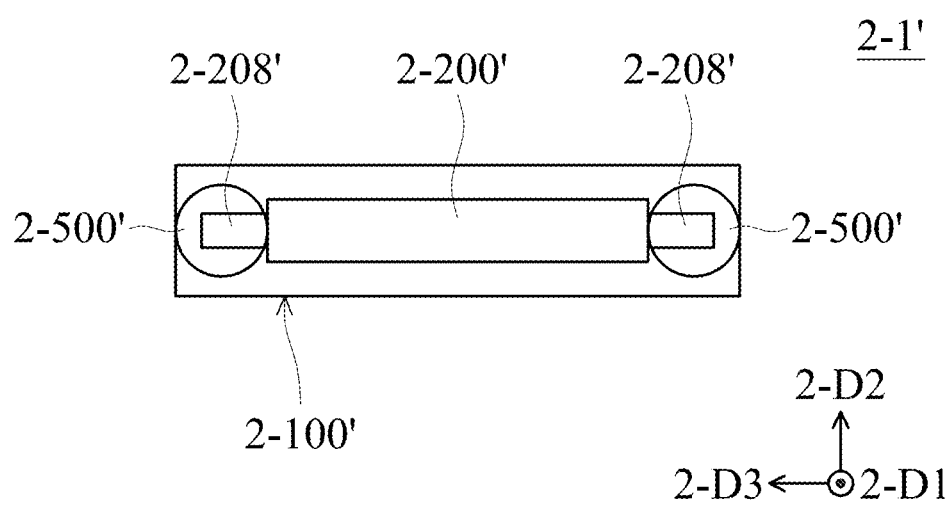
FIG. 10 is a schematic diagram of a partial structure of an optical element driving mechanism according to another embodiment of the present disclosure.

Refer to FIG. 8 to FIG. 10, FIG. 9 is a cross-sectional view of the optical element driving mechanism 2-1 taken along line B-B' in FIG. 1, and FIG. 10 is a schematic diagram of a partial structure of the optical element driving mechanism 2-1 according to another embodiment of the present disclosure. As shown in FIG. 8, the two cylindrical guiding elements 2-500 are fixedly disposed on the base 2-120 of the fixed portion 2-100, and pass through the first chute 2-204 and the second chute 2-205 of the movable portion 2-200 respectively. An inner wall 2-204A of the first chute 2-204 is covered with a coating to reduce the friction between the guiding element 2-500 and the first chute 2-204 when the movable portion 2-200 is moved. In this embodiment, the optical element driving mechanism 2-1 has a rectangular structure. When viewed along the second direction 2-D2, the first chute 2-204 and the driving assembly 2-300 are arranged diagonally, and the second chute 2-205 is disposed at a corner different from the first chute 2-204 and the driving assembly 2-300. When viewed along the third direction 2-D3, the guiding element 2-500 at least partially overlaps the conversion element 2-340, the guiding element 2-500 at least partially overlaps the transmission element 2-320, and the guiding element 2-500, the conversion element 2-340 and the transmission element 2-320 at least partially overlap.

In addition, the first chute 2-204 is a closed type, that is, as shown in FIG. 8, the first chute 2-204 surrounds the guiding element 2-500. On the other hand, the second chute 2-205 is a non-closed type, as shown in FIG. 8, the guiding element 2-500 is not completely surrounded by the second chute 2-205. Compared this designed structure to a structure with only one chute which is a closed type, the first chute 2-204 which is closed type may make the movable portion 2-200 to move completely along the chute, while the second chute 2-205 which is a non-closed type may assist the movement of the movable portion 2-200 in the second direction 2-D2. In addition, compared to a structure with two chutes which are closed types, the second chute 2-205 which is a non-closed type may reduce the probability that the guiding element 2-500 cannot pass through the chute during assembly due to manufacturing tolerances, and thus improve the assembly success rate of the optical element driving mechanism 2-1.

As shown in FIG. 9, the top surface 2-206 of the movable portion 2-200 faces the inner top wall 2-110C of the top case 2-110, and the bottom surface 2-207 of the movable portion 2-200 faces the inner bottom wall 2-120B of the base 2-120. The top surface 2-206, the bottom surface 2-207, the inner top wall 2-110C, and the inner bottom wall 2-120B are perpendicular to the second direction 2-D2. When viewed along the third direction 2-D3, a first distance 2-R1 between the top surface 2-206 and the inner top wall 2-110C is shorter than a length 2-L of the guiding element 2-500 in the second direction 2-D2, and a second distance 2-R2 between the bottom surface 2-207 and the inner bottom wall 2-120B is shorter than the length 2-L of the guiding element 2-500 in the second direction 2-D2. That is, since the guiding element 2-500 is long enough, even if the movable portion 2-200 reaches the maximum movement range, it will not separate from the guiding element 2-500.

However, the guiding element 2-500 and the chute are not limited to the above structure, and the form and number of the guiding element 2-500 and the chute may be changed according to requirements. For example, as shown in FIG. 10, in some other embodiments, an optical element driving mechanism 2-1' has a structure and elements similar to the optical driving mechanism 2-1, wherein the guiding element 2-500' is a spherical structure and is fixed on both sides of the fixed portion 2-100'. The movable portion 2-200' has a chute 2-208', and at least part of the guiding element 2-500' is located in the slide slot 2-208', which can make the movable portion 2-200' move in the second direction 2-D2 and avoid the occurrence of offsets.

Refer to FIG. 8 and FIG. 9, the first elastic element 2-600 is elastically connected to the movable portion 2-200 and the fixed portion 2-100. The first elastic element 2-600 has two first movable connecting portions 2-610 connected to the movable portions 2-200 and two first fixed connecting portions 2-620 connected to the fixed portion 2-100. Two first movable connecting portions 2-610 are arranged diagonally in the rectangular structure, and two first fixed connecting portions 2-620 are also arranged diagonally in the rectangular structure. When viewed along the second direction 2-D2, the first movable connecting portion 2-610 and the first fixed connecting portion 2-620 do not overlap. When the movable portion 2-200 is moved along the second direction 2-D2 away from a light emitting surface 2-E, the first elastic element 2-600 may apply a force to the movable portion 2-200 in the opposite direction to prevent the movable portion 2-200 from moving beyond a certain range.

The second elastic element 2-700 is elastically connected to the movable portion 2-200 and the fixed portion 2-100.

The second elastic element 2-700 is disposed closer to the light emitting surface 2-E than the first elastic element 2-600, and the second elastic element 2-700 and the driving assembly 2-300 are arranged diagonally in a rectangular structure. The overall structure of the optical element driving mechanism 2-1 may be more balanced by this design. When the movable portion 2-200 is moved along the second direction 2-D2 close to the light emitting surface 2-E, the second elastic element 2-700 may apply a force to the movable portion 2-200 in the opposite direction to prevent the movable portion 2-200 from moving beyond a certain range. The second elastic element 2-700 has a second movable connecting portion 2-710 connected to the movable portion 2-200 and a second fixed connecting portion 2-720 connected to the fixed portion 2-100. The second movable connecting portion 2-710 and the second fixed connecting portion 2-720 are located at the same corner of the rectangular structure.

When viewed along the second direction 2-D2, the first elastic element 2-600 and the second elastic element 2-700 do not overlap, the driving assembly 2-300 and the first elastic element 2-600 partially overlap, and the driving assembly 2-300 and the second elastic element 2-700 do not overlap, and one of the second movable connecting portion 2-710 and the first movable connecting portion 2-610 are located at the same corner of the rectangular structure.

Figure 11:
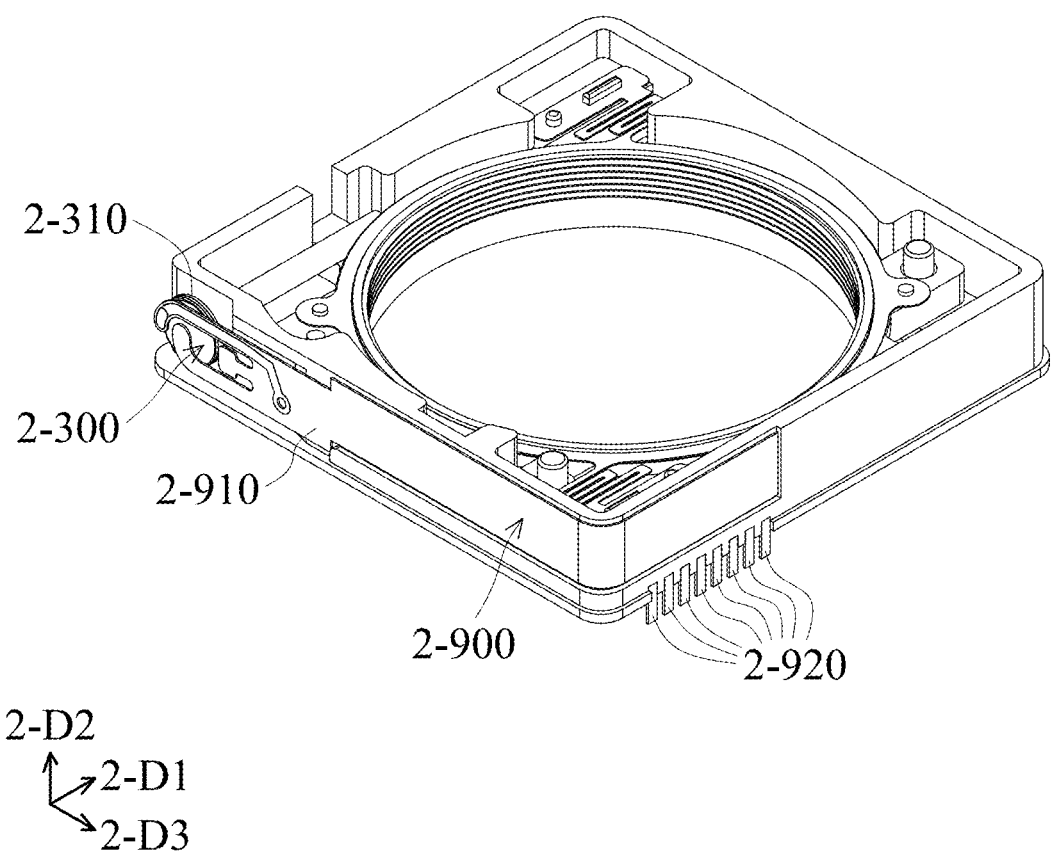
FIG. 11 is a schematic diagram of a partial structure of an optical element driving mechanism according to an embodiment of the present disclosure.

Next, refer to FIG. 8 and FIG. 11, FIG. 11 is a schematic diagram of a partial structure of the optical element driving mechanism 2-1 according to an embodiment of the present disclosure. The circuit assembly 2-900 is electrically connected to the driving assembly 2-300. When viewed along the second direction 2-D2, the circuit assembly 2-900 is disposed on at least two sides of the rectangular structure. In this embodiment, the circuit assembly 2-900 includes an internal circuit element 2-910 and an external circuit element 2-920. The internal circuit element 2-910 is a flexible printed circuit board (FPC) with a shape that is close to a rectangle. The internal circuit element 2-910 is bent at a corner of the rectangular structure to form a L-shaped structure, and is disposed on two sides of the rectangular structure. The internal circuit element 2-910 is connected to the piezoelectric element 2-310 on one side, and extends to the other side, and then is connected to the external circuit element 2-920. When viewed along the second direction 2-D2, the circuit assembly 2-900, the first elastic element 2-600, and the second elastic element 2-700 do not overlap. When viewed along the third direction 2-D3, the circuit assembly 2-900 and the second elastic element 2-700 do not overlap. With such a design, the miniaturization of the optical element driving mechanism 2-1 may be achieved.

Back to FIG. 2, the position sensing assembly 2-800 is used to sense the movement of the movable portion 2-200 relative to the fixed portion 2-100. At least part of the position sensing assembly 2-800 is disposed on the movable portion 2-200, and at least another part of the position sensing assembly 2-800 is disposed on the fixed portion 2-100. In this embodiment, the position sensing assembly 2-800 includes a sensing element 810 and a sensing magnetic element 820. The sensing element 810 is disposed on the base 2-120 of the fixed portion 2-100, and the sensing magnetic element 820 is disposed on the movable portion 2-200. More specifically, the sensing element 810 may be, for example, a Hall effect sensor, a MR sensor, or a Fluxgate, etc., disposed to sense a magnetic field of the sensing magnetic element 820 on the holder 2-200 to obtain the position of the holder 2-200 relative to the base 2-120, but it is not limited to this. In some embodiments, the sensing element 810 is disposed on the movable portion 2-200, and the sensing magnetic element 820 is disposed on the fixed portion 2-100. In some embodiments, the sensing element 810 is disposed on the circuit assembly 2-900, and the sensing magnetic element 820 is disposed on the movable portion 2-200.

Figure 12:
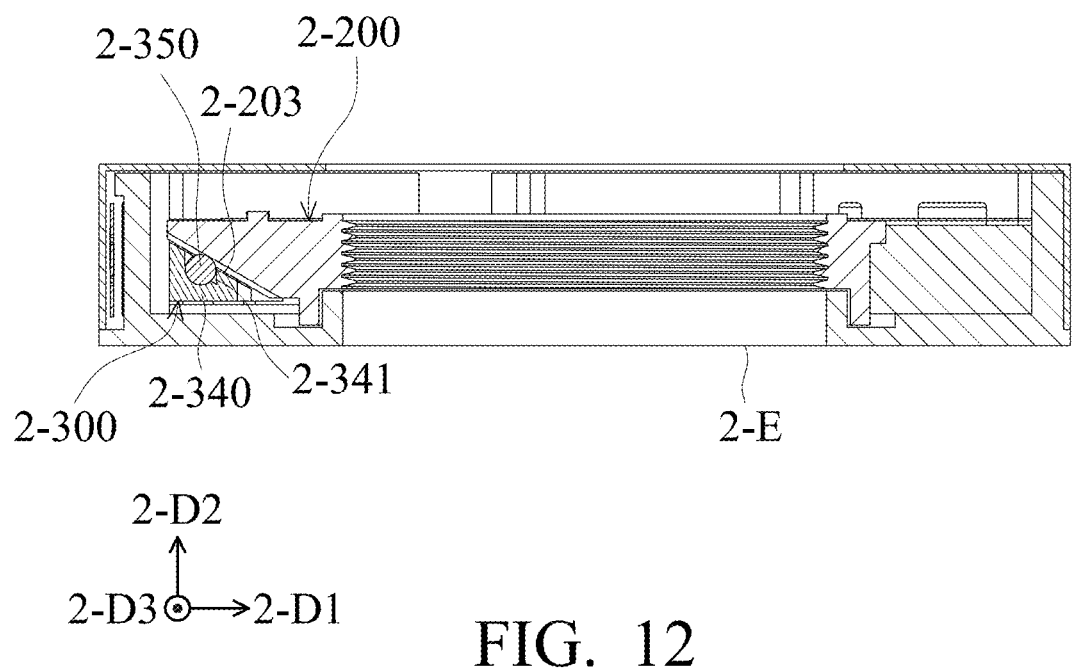
FIG. 12 is a cross-sectional view of the optical element driving mechanism taken along line C-C' in FIG. 1.
Figure 13:
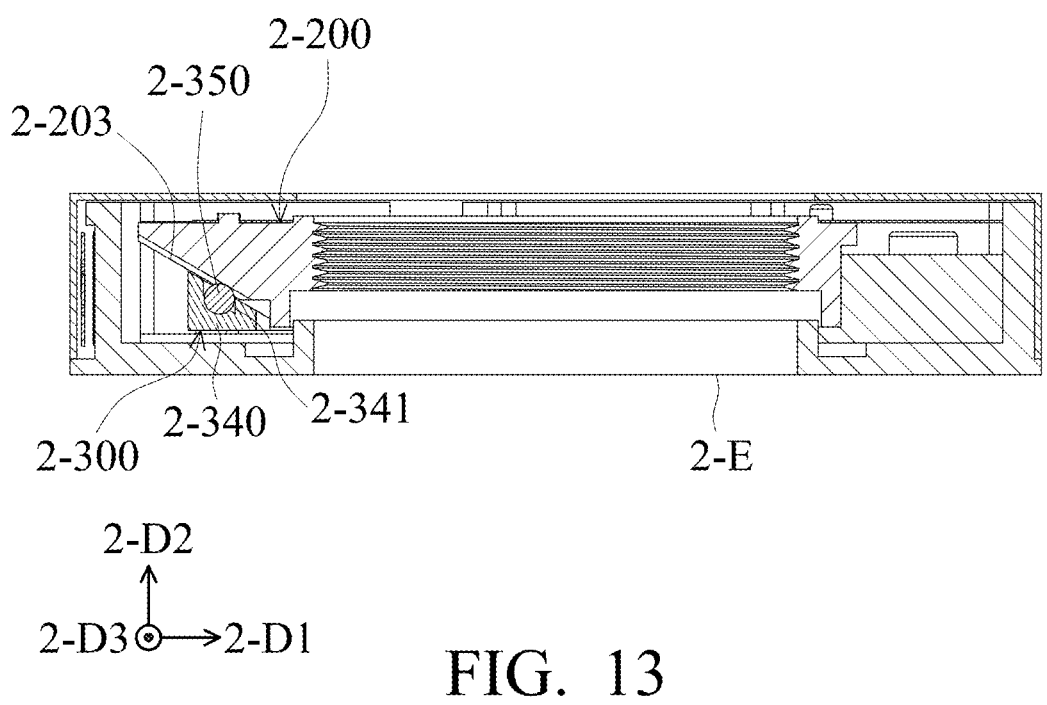
FIG. 13 is a cross-sectional view of the optical element driving mechanism taken along line C-C' in FIG. 1.

Next, the operation of the optical element driving mechanism 2-1 will be described with reference to FIG. 2, FIG. 12, and FIG. 13. FIG. 12 and FIG. 13 are cross-sectional views of the optical element driving mechanism 2-1 taken along line C-C' in FIG. 1, FIG. 12 is before the driving assembly 2-300 drives the movable portion 2-200, and FIG. 13 is after the driving assembly 2-300 drives the movable portion 2-200. When a voltage is applied externally and then transmitted to the driving assembly 2-300 via the circuit assembly 2-900, the circular-plate-shaped piezoelectric element 2-310 is deformed, for example, slowly bent outward (the periphery of the piezoelectric element 2-310 is closer to the side wall 2-110B than the center of the piezoelectric element 2-310), and then the transmission element 2-320 is moved in the first direction 2-D1 that is away from the piezoelectric element 2-310. At this time, there is a static friction between the transmission element 2-320 and the clamping element 2-330, so there is no relative movement between the transmission element 2-320 and the clamping element 2-330. Then, the voltage is controlled so that the piezoelectric element 2-310 bends inward rapidly (the center of the piezoelectric element 2-310 is closer to the side wall 2-110B than the periphery of the piezoelectric element 2-310), and the transmission element 2-320 is therefore moved rapidly in the first direction 2-D1 that is close to the piezoelectric element 2-310, and the static friction between the transmission element 2-320 and the clamping element 2-330 is overcome, thereby making the clamping element 2-330 move relative to the transmission element 2-320 in the first direction 2-D1 that is away from the piezoelectric element 2-310. Therefore, the movement of the clamping element 2-330 in the first direction 2-D1 may be controlled by repeating the above steps.

As shown in FIG. 2, FIG. 12, and FIG. 13, when the clamping element 2-330 is controlled to move in the first direction 2-D1 that is away from the piezoelectric element 2-310, the conversion element 2-340 connected to the clamping element 2-330 is moved in the same direction, and the first intermediary element 2-350 disposed in the first groove 2-341 of the conversion element 2-340 is moved in the movable-portion-sliding rail 2-203 of the movable portion 2-200, so that the movable portion 2-200 is moved along the guiding element 2-500 in the second direction 2-D2 toward the direction away from the light emitting surface 2-E, and the position of the movable portion 2-200 relative to the fixed portion 2-100 may be obtained by the position sensing assembly 2-800. Therefore, it is possible to control the movement of the movable portion 2-200 in the second direction 2-D2 by controlling the movement of the driving assembly 2-300 in the first direction 2-D1.

In a conventional optical element driving mechanism, a driving assembly and a movable portion are moved in the same direction. That is, a long shaft of a transmission element is disposed parallel to an optical axis. If a range of movement of the movable portion is expected to be wider, a length of the transmission element must be increased, which causes the overall size of the optical element driving mechanism to be larger. In this embodiment with the different structural design, the transmission element 2-320 (the long shaft) is horizontally disposed in the optical element driving mechanism 2-1 (perpendicular to the optical axis 2-0), compared to the configuration of the conventional optical element driving mechanism, the transmission element 2-320 may be designed to be longer without affecting the overall size of the optical element driving mechanism 2-1. The movable portion 2-200 may therefore have a larger range of movement, or the movable portion 2-200 may have the same range of movement as the conventional movable portion, but a smaller optical element driving mechanism 2-1 may be provided.

As described above, the embodiment of present invention provides an optical element driving mechanism, including a fixed portion, a movable portion, and a driving assembly. The movable portion is movably disposed on the fixed portion. The driving assembly is disposed on the fixed portion, and drives the movable portion to move relative to the fixed portion. Thereby, a smaller optical element driving mechanism that can control the movement of the movable portion in the second direction by controlling the movement of the driving assembly in the first direction may be provided.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, having an optical axis, comprising:
    a fixed portion;
    a movable portion, which is movable relative to the fixed portion; and
    a driving assembly, comprising:
        a piezoelectric element, deformed by a voltage;
        a transmission element, connected to the piezoelectric element and moving along a first direction with a deformation of the piezoelectric element; and
        a conversion element, disposed between the movable portion and the transmission element, and moving along the first direction with the moving of the transmission element to drive the movable portion to move along a second direction relative to the fixed portion,
    wherein the first direction is not parallel to the second direction.

2. The optical element driving mechanism as claimed in claim 1, wherein the driving assembly further comprises:
    a clamping element, disposed on the transmission element, which is movable relative to the transmission element; and
    a first intermediary element, connected to the conversion element and the movable portion,
    wherein the piezoelectric element having a circular plate shape extends along a third direction,
    wherein the conversion element is connected to the clamping element, and
    wherein the piezoelectric element makes the transmission element move along the first direction, and the transmission element further makes the clamping element move along the first direction, and the conversion element and the first intermediary element enable the movable portion to move along the second direction.

3. The optical element driving mechanism as claimed in claim 2, wherein the movable portion has a movable-portion-sliding surface, the fixed portion has a fixed-portion-sliding surface, and the conversion element has a conversion-element-first-sliding surface and a conversion-element-second-sliding surface, the conversion-element-first-sliding surface faces the movable-portion-sliding surface, and the movable-portion-sliding surface and the conversion-element-first-sliding surface are not perpendicular to the first direction and the second direction, and the movable-portion-sliding surface and the conversion-element-first-sliding surface are not parallel to the first direction and the second direction, and the conversion-element-second-sliding surface faces the fixed-portion-sliding surface, and the conversion-element-second-sliding surface and the fixed-portion-sliding surface are parallel to the first direction.

4. The optical element driving mechanism as claimed in claim 3, wherein the movable-portion-sliding surface has a movable-portion-sliding rail, and the conversion-element-first-sliding surface has a first groove, and the first groove and the movable-portion-sliding rail accommodate part of the first intermediary element, respectively.

5. The optical element driving mechanism as claimed in claim 4, wherein the driving assembly further comprises a second intermediary element, the conversion-element-second-sliding surface has a second groove, and the fixed-portion-sliding surface has an the fixed-portion-sliding rail extending along the first direction, and the second groove and the fixed-portion-sliding rail accommodate part of the second intermediary element, respectively.

6. The optical element driving mechanism as claimed in claim 2, further comprising a bonding element, wherein the fixed portion further comprises a base, and the driving assembly is connected to the base of the fixed portion using the bonding element.

7. The optical element driving mechanism as claimed in claim 6, wherein the base has a first connecting surface which is parallel to the second direction, and the bonding element is disposed between the first connecting surface of the base and the piezoelectric element.

8. The optical element driving mechanism as claimed in claim 7, wherein the base further has a second connecting surface, and the second connecting surface is perpendicular to the second direction, and the bonding element is further disposed between the second connecting surface and the transmission element.

9. The optical element driving mechanism as claimed in claim 8, wherein when viewed along the second direction, the first connecting surface at least partially overlaps the transmission element, and when viewed along the second direction, the second connecting surface at least partially overlaps the transmission element.

10. The optical element driving mechanism as claimed in claim 2, further comprising a guiding element, the movable portion has a first chute, and an inner wall of the first chute is covered with a coating, and the guiding element is fixedly disposed on the fixed portion, and is at least partially located in the first chute of the movable portion to enable the movable portion to move along the guiding element, wherein when viewed along the third direction, the guiding element and the conversion element at least partially overlap, and the guiding element and the transmission element at least partially overlap, and the guiding element, the conversion element, and the transmission element at least partially overlap.

11. The optical element driving mechanism as claimed in claim 10, wherein the movable portion further has a second chute, and the first chute and the second chute are at least one type of a closed type and a non-closed type.

12. The optical element driving mechanism as claimed in claim 10, wherein the movable portion has a top surface and a bottom surface, and the fixed portion has an inner top wall and an inner bottom wall, and the top surface faces the inner top wall and the bottom surface faces the inner bottom wall, the top surface, the bottom surface, the inner top wall, and the inner bottom wall are perpendicular to the second direction, and when viewed along the third direction, a first distance between the top surface and the inner top wall is shorter than a length of the guiding element in the second direction, and a second distance between the bottom surface and the inner bottom wall is shorter than the length of the guiding element in the second direction.

13. The optical element driving mechanism as claimed in claim 10, wherein the guiding element has a cylindrical structure extending along the second direction.

14. The optical element driving mechanism as claimed in claim 10, wherein the guiding element has a spherical structure.

15. The optical element driving mechanism as claimed in claim 2, having a rectangular structure, further comprising:

a first elastic element, having two first movable connecting portions connecting the movable portion and two first fixed connecting portions connecting the fixed portion, the first movable connecting portions are arranged diagonally in the rectangular structure, and the first fixed connecting portions are arranged diagonally in the rectangular structure, and when viewed along the second direction, the first movable connecting portions and the first fixed connecting portions do not overlap; and a second elastic element, disposed closer to a light emitting surface than the first elastic element, and the second elastic element is disposed diagonally with the driving assembly, and has a second movable connecting portion connected to the movable portion and a second fixed connecting portion connected to the fixed portion, wherein when viewed along the second direction, the first elastic element and the second elastic element do not overlap.

16. The optical element driving mechanism as claimed in claim 15, wherein when viewed along the second direction, the driving assembly partially overlaps the first elastic element, and the driving assembly and the second elastic element do not overlap.

17. The optical element driving mechanism as claimed in claim 15, wherein when viewed along the second direction, the second movable connecting portion and one of the first movable connecting portions are located in the same corner of the rectangular structure.

18. The optical element driving mechanism as claimed in claim 2, further comprising a position sensing assembly for sensing the relative movement of the fixed portion and the movable portion, at least part of the position sensing assembly is disposed on the movable portion, and at least another part of the position sensing assembly is disposed on the fixed portion.

19. The optical element driving mechanism as claimed in claim 18, wherein the position sensing assembly comprises a sensing element and a sensing magnetic element, the sensing element is disposed on the fixed portion, and the sensing magnetic element is disposed on the movable portion.

20. The optical element driving mechanism as claimed in claim 18, having a rectangular structure, further comprising a circuit assembly electrically connected to the driving assembly, when viewed along the second direction, the circuit assembly is disposed on at least two sides of the rectangular structure, wherein the position sensing element comprises a sensing element and a sensing magnetic element, the sensing element is disposed on the circuit assembly, and the sensing magnetic element is disposed on the movable portion.

* * * * *